United States Patent [19]

Mima et al.

[11] Patent Number: 5,196,277
[45] Date of Patent: Mar. 23, 1993

[54] SODIUM-SULFUR CELL AND METHOD OF JOINING SOLID ELECTROLYTE TUBE AND INSULATIVE RING

[75] Inventors: Toshiyuki Mima, Toyoake; Michimasa Fujii, Mie; Hirohiko Iwasaka, Nagoya, all of Japan

[73] Assignee: NGK Insulators, Ltd., Japan

[21] Appl. No.: 772,325

[22] Filed: Oct. 7, 1991

[30] Foreign Application Priority Data

Oct. 25, 1990 [JP] Japan .................................. 2-290266
Sep. 24, 1991 [JP] Japan .................................. 3-273383

[51] Int. Cl.⁵ .......................................... H01M 10/39
[52] U.S. Cl. .................................... 429/104; 29/623.2
[58] Field of Search .................. 429/104, 174, 185; 29/623.1, 623.2

[56] References Cited

U.S. PATENT DOCUMENTS 4,074,026 2/1978 Bones ................................... 429/104
4,590,136 5/1986 Buehler et al. ...................... 429/104
4,770,956 9/1988 Knodler ............................... 429/104

Primary Examiner—Anthony Skapars
Attorney, Agent, or Firm—Parkhurst, Wendel & Rossi

[57] ABSTRACT

An excellent stable sodium-sulfur cell having a high mechanical strength and a very long life is provided. The cell eliminates formation of cracks in a joining portion of the solid electrolyte tube and the insulative ring of the cell with the aid of a solder glass filled in a gap between the solid electrolyte tube and the insulative ring, preferably with the aid of a tapered portion formed at at least one of the solid electrolyte tube and the insulative ring, thereby to completely obviate a direct reaction of active substances of the positive electrode and the negative electrode, overheating and destruction of the cell. The sodium-sulfur cell, includes a solid electrolyte tube, an insulative ring, a gap of 100–500 μm formed between the solid electrolyte tube and the insulative ring, and a solder glass filled in the gap for joining the insulative ring to the solid electrolyte tube.

8 Claims, 13 Drawing Sheets

FIG_1
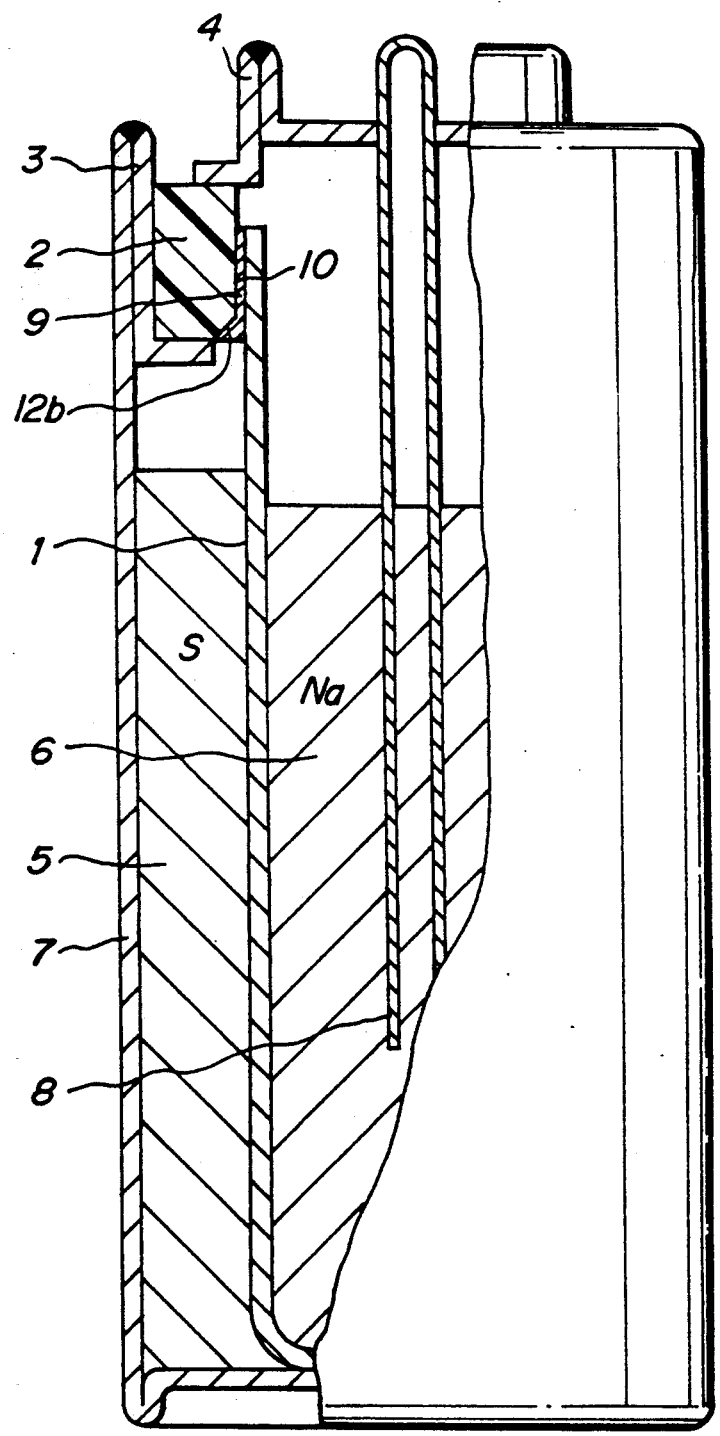

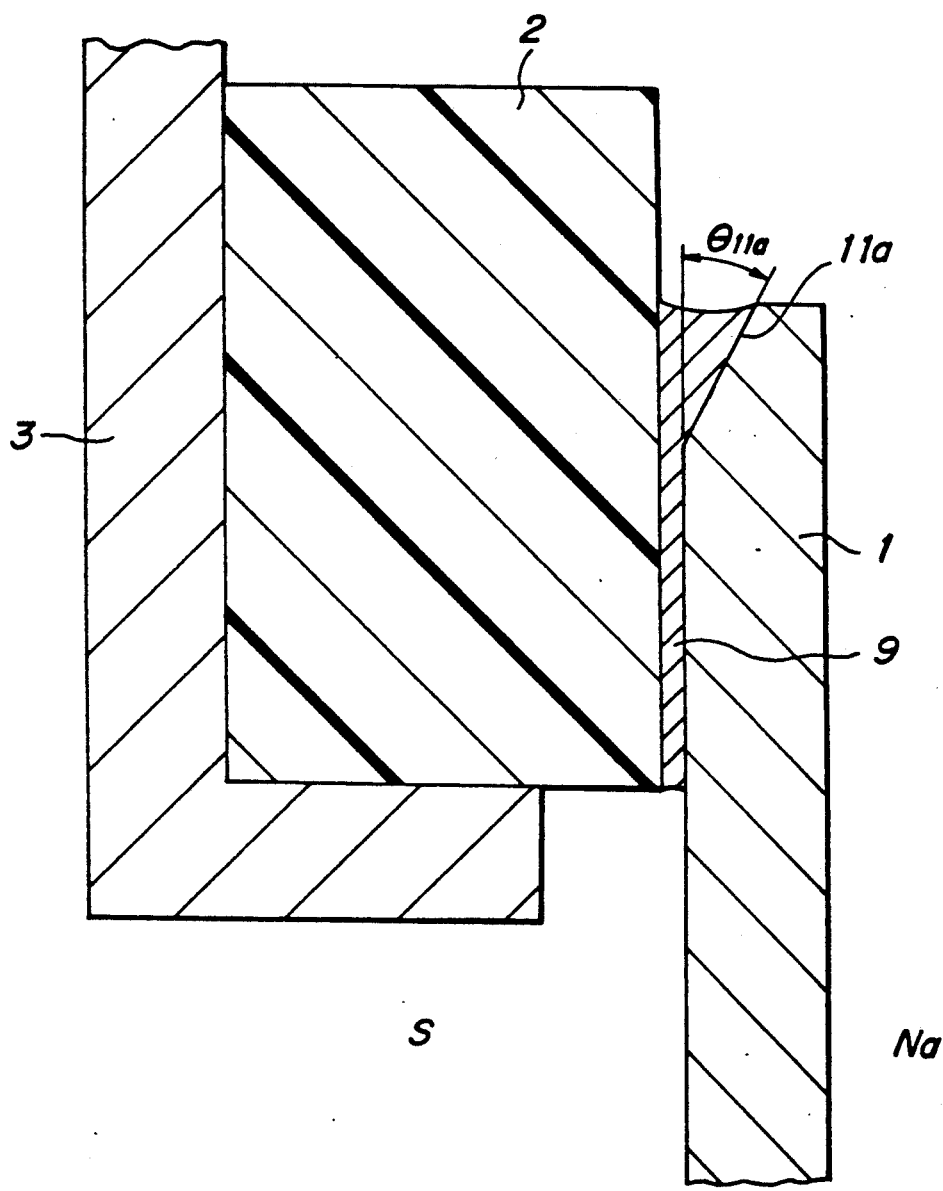

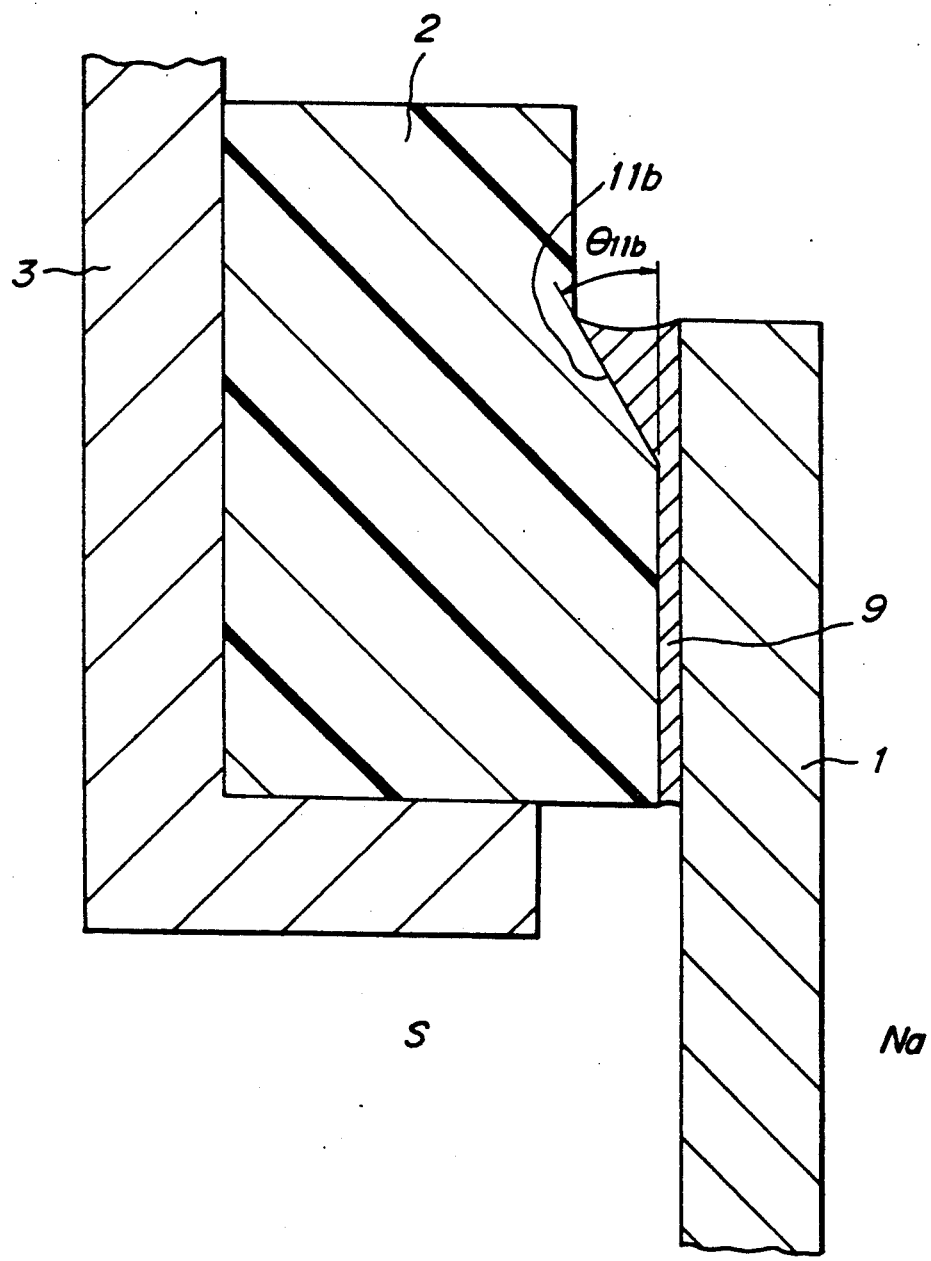
FIG_2c

FIG_2d
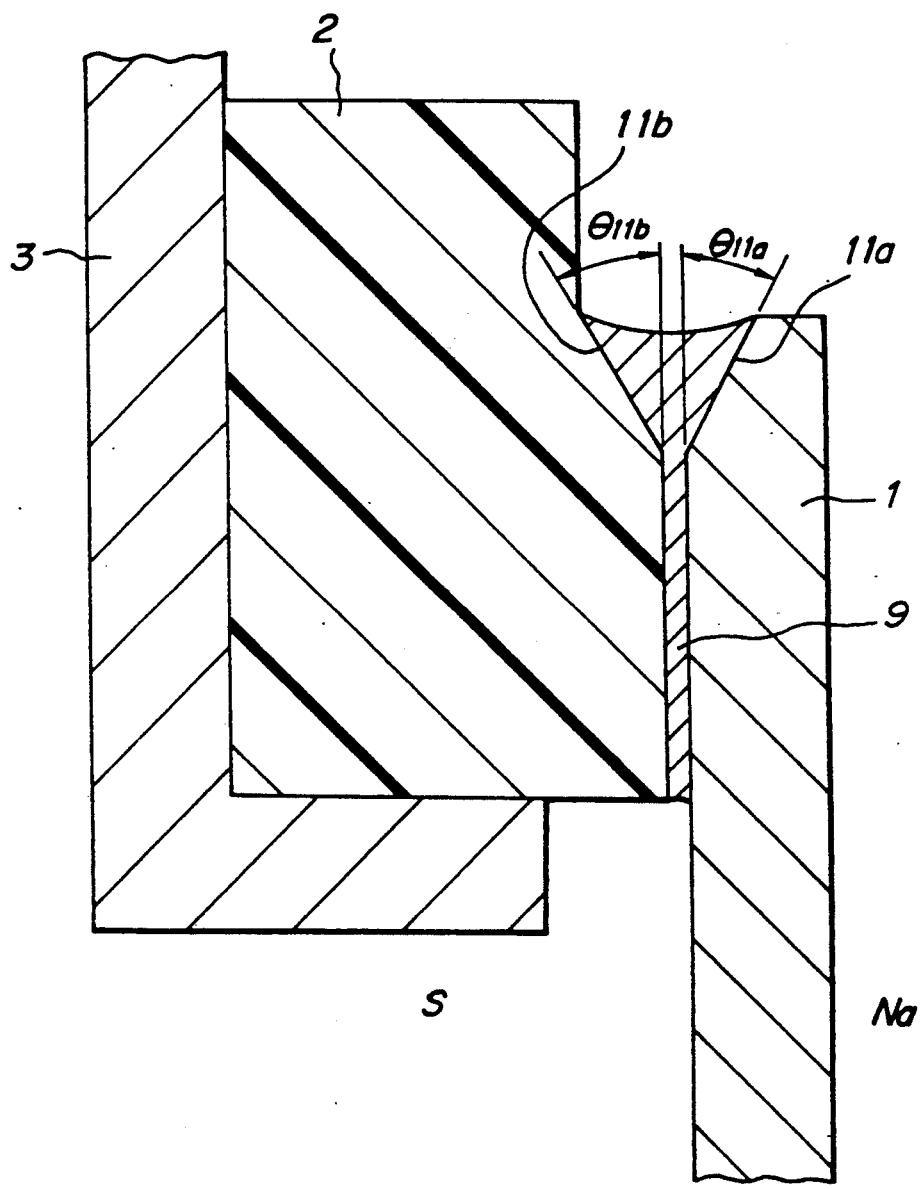

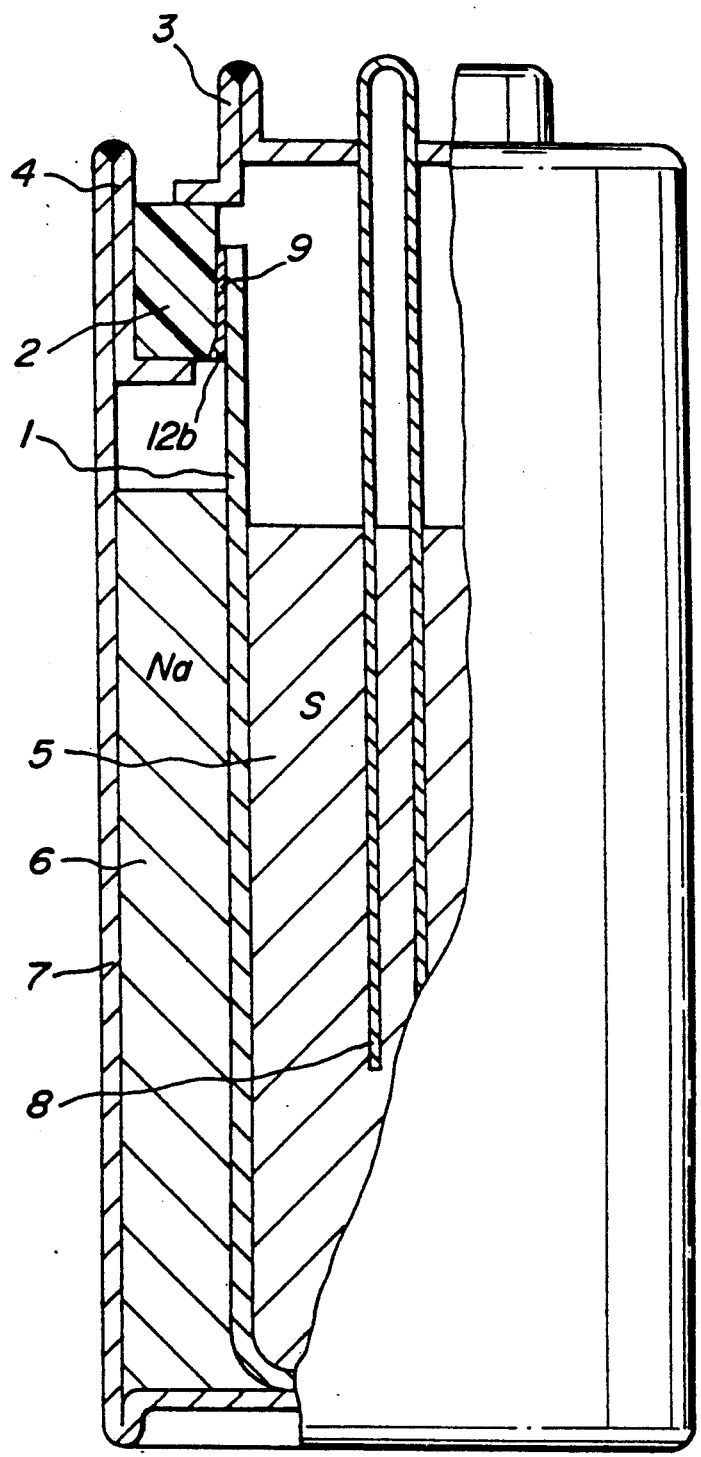
FIG_3a

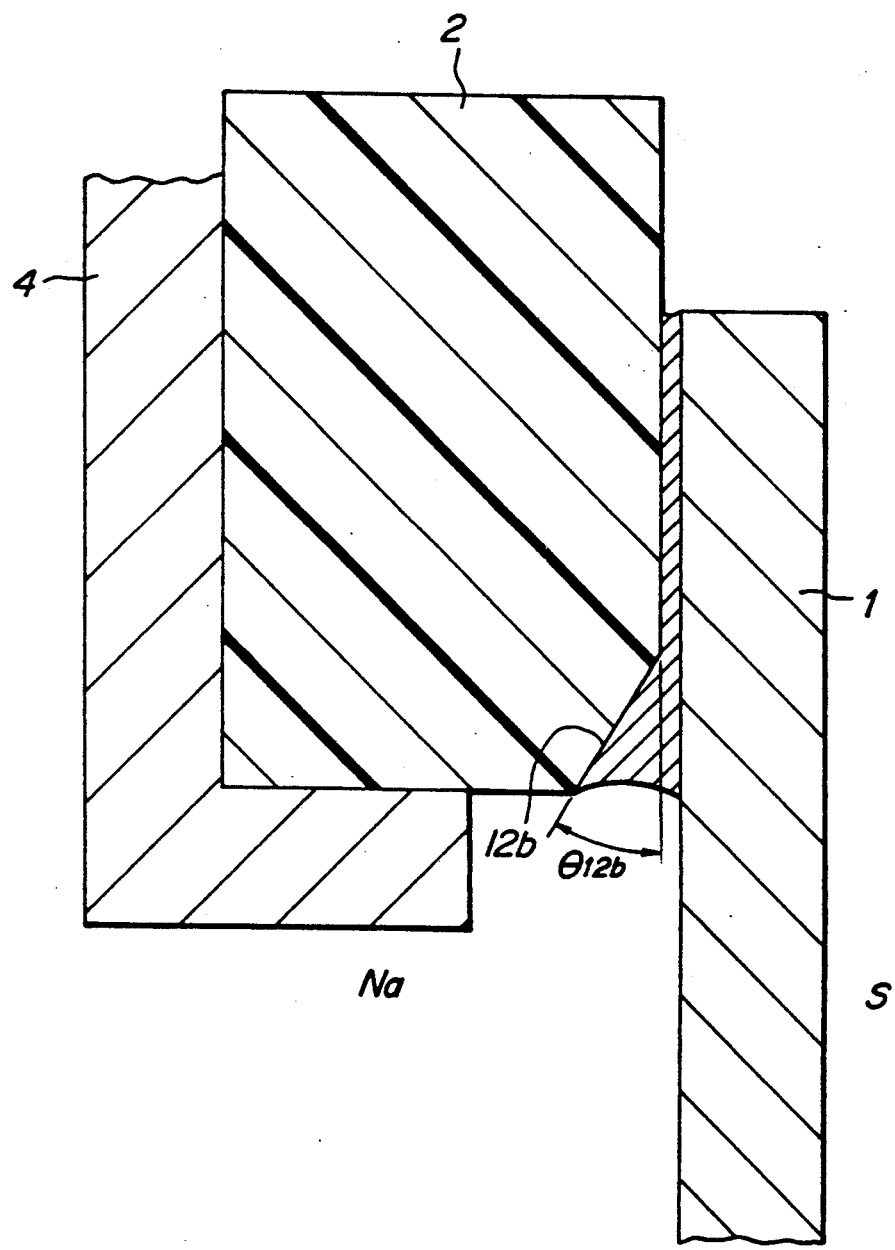
FIG_3b

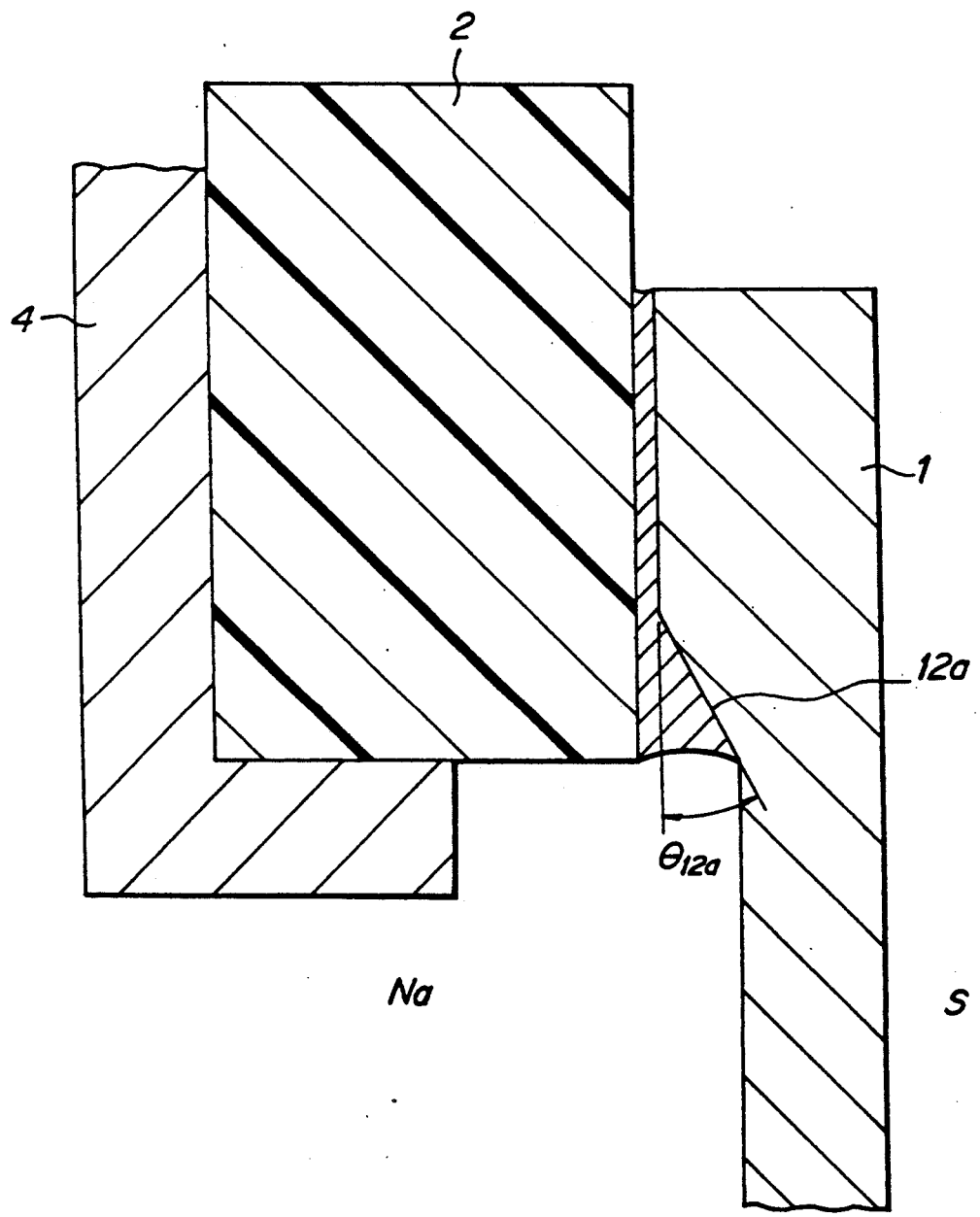
FIG_3c

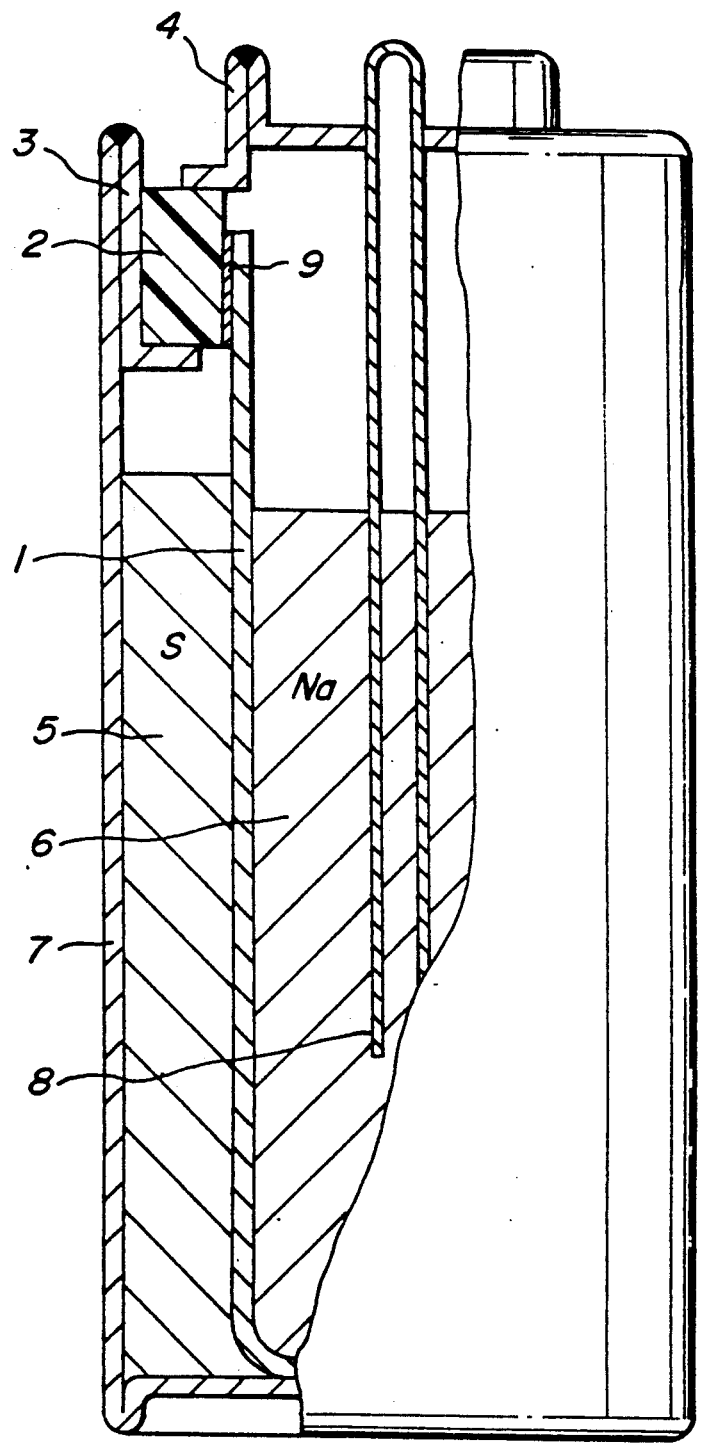
FIG_4a
PRIOR ART

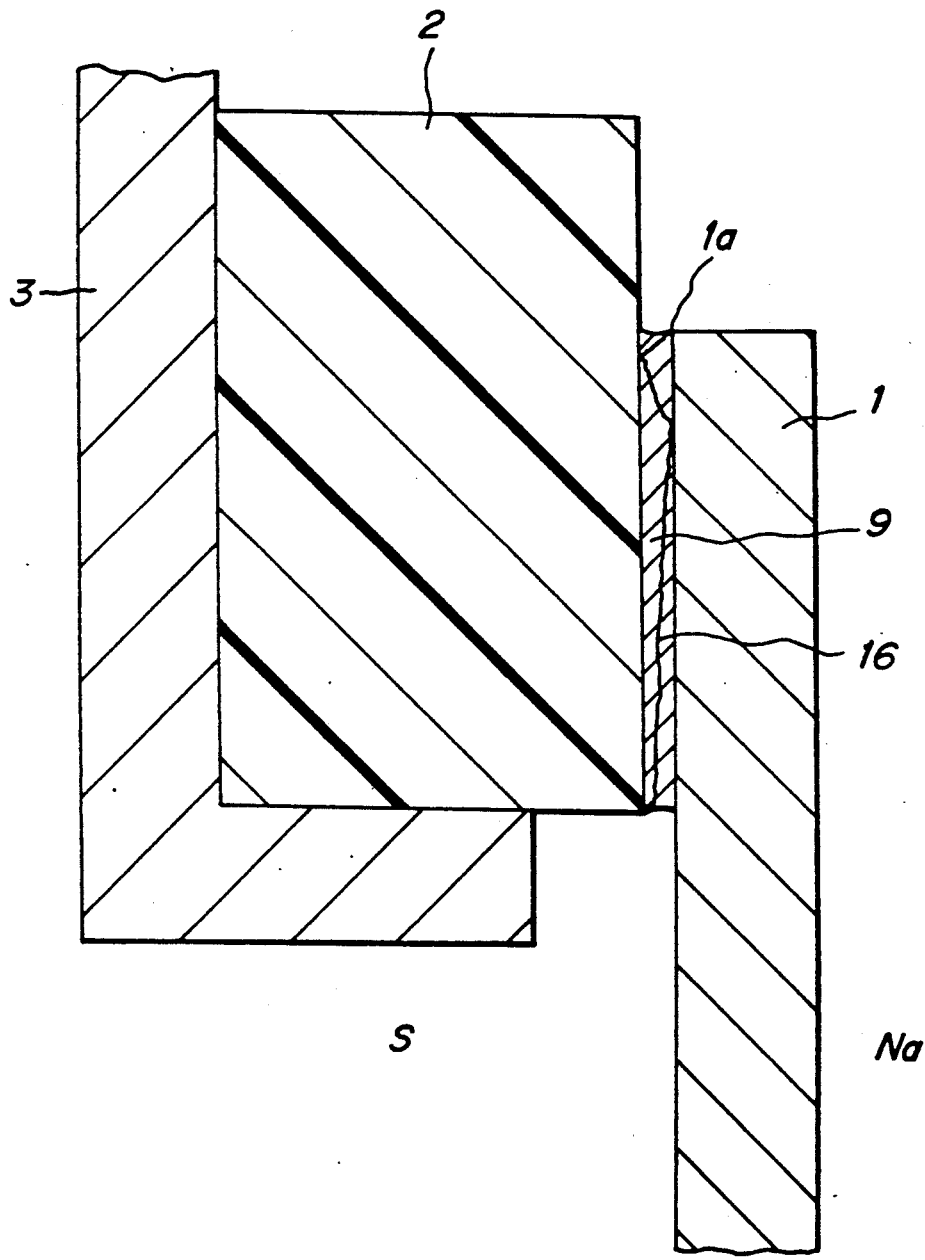

SODIUM-SULFUR CELL AND METHOD OF JOINING SOLID ELECTROLYTE TUBE AND INSULATIVE RING

BACKGROUND OF THE INVENTION

1. Field of the Invention

The present invention relates to a sodium-sulfur cell, particularly a sodium sulfur cell having a solid electrolyte tube joined to an insulative ring which electrically insulates a positive electrode chamber from a negative electrode chamber, and a method of joining the solid electrolyte tube and the insulative ring.

2. Related Art Statement

A sodium-sulfur cell is a sealed type high temperature secondary cell which is operated at a high temperature of 300°-350° C. having a sodium ion-conductive solid electrolyte tube made of $\beta$-alumina, $\beta''$-alumina or the like for separating sodium which is an active substance of the negative electrode from sulfur which is an active substance of the positive electrode.

A structure of a conventional sodium-sulfur cell is shown in the attached FIG. 4a, having a solid electrolyte tube 1, a negative electrode chamber 6 filled with sodium arranged at the inside of the solid electrolyte tube 1, a positive electrode chamber 5 filled with sulfur arranged at the outside of the solid electrolyte tube 1, and an insulative ring 2 made of $\alpha$-alumina joined to the upper end of the outer circumferential surface of the solid electrolyte tube 1 by means of a solder glass 9. Reference numerals 3 and 4 are metallic lids made of aluminum or coated with aluminum joined under pressure and heating to the bottom surface and the top surface of the insulative ring 2 for covering the positive electrode chamber and the negative electrode chamber, respectively. Reference numeral numeral 7 is a cell vessel, and 8 is a negative electrode terminal tube.

A joining portion of the solid electrolyte tube 1 and the insulative ring 2 of FIG. 4a is shown in enlarged view in the attached FIG. 4b, wherein reference numeral 9 is a solder glass made of an alumina-borosilicate series glass, etc.

Though the sodium-sulfur cell of conventional structure of FIGS. 4a and 4b has the positive electrode chamber 5 and the negative electrode chamber 6 at the outside and the inside, respectively, of the solid electrolyte tube 1, the sodium-sulfur cell may also be formed by arranging the negative electrode chamber 5 and the positive electrode 6 vice versa, namely at the inside and the outside, respectively, of the solid electrolyte tube 1.

Because the sodium-sulfur cell is a type of cell which is operated at a high temperature of 300°-350° C., it undergoes a large thermal change due to start and stop of its operation, and the amount of sodium ions which is the active substance is increased or decreased by transfer thereof through the solid electrolyte tube 1 due to charge and discharge of the cell. Consequently, the joining portion of the solid electrolyte 1 and the insulating ring 2 is liable to suffer from thermal or mechanical stresses, and cracks and damage are likely to occur at the solder glass 9 or the solid electrolyte tube 1.

Particularly, the joining portion of the solid electrolyte tube 1 and the insulative ring 2 of the conventional sodium-sulfur cell as shown in FIGS. 4a and 4b is more liable to suffer from to thermal mechanical stresses at a joining portion of the solder glass 9 and the upper end corner 1a of the solid electrolyte 1 due to an internal stress of the solder glass 9 when the solder glass 9 is corroded by metallic sodium or sodium vapor, and a danger of inducing a crack 16 in the solder glass 9 as shown in FIG. 4b is increased. Thus, a very dangerous state is likely to occur that sodium or a sodium vapor invades from the negative electrode chamber to the positive electrode chamber 5 through the crack 16 to directly react with sulfur or a sulfide which is the active substance of the positive electrode thereby to generate an extraordinary excessive heat which further broadens the crack or breakage 10.

Moreover, the solid electrolyte tube of a bottomed tube shape separating the positive electrode chamber from the negative electrode chamber is joined at its upper end to the upper end of the positive electrode chamber via the insulative ring made of $\alpha$-alumina for electrically insulating the positive electrode from the negative electrode, and the joining portion is exerted by various stresses at the time of ascent or descent of the cell temperature, so that a superior mechanical strength is required to achieve a joining portion which is not broken for a long period of use. However, the makers of joining portion of the conventional cell have not paid attention to such consideration, so that the joining portion is rather weak in mechanical strength and poor in corrosion resistant property. Accordingly, cracks are generated which allow direct reaction of the active substances of the electrodes with each other resulting in problems of overheating of the cells.

As a solder glass 9 at the joining portion used for joining the solid electrolyte tube 1 and the insulative ring 2, an alumina borosilicate series glass is usually used. The joining is effected by a method of inserting the lower portion of the solid electrolyte tube 1 through the insulative ring 2, inserting a glass ring into a gap formed between the solid electrolyte tube 1 and the insulative ring 2, and then heating and melting the glass ring in an electric furnace. However, joined bodies of the solid electrolyte tubes 1 and the insulative rings 2 have a large fluctuation in mechanical strength and are deficient in reliability.

SUMMARY OF THE INVENTION

Therefore, an object of the present invention is to provide a sodium-sulfur cell which obviates the above drawbacks and maintains a stable state of joining of the solid electrolyte tube and the insulative ring and can be used for a long period of time without forming a crack at the joining portion.

Another object of the present invention is to reduce a residual stress remaining in the joining glass or solder glass so as to prevent formation of a crack in the solder glass even when the solder glass is corroded by the active material sodium or its vapor of the negative electrode.

A further object of the present invention is to provide a method of joining the solid electrolyte tube and the insulative ring by means of the joining portion having a high mechanical strength and a small fluctuation in the mechanical strength.

In the first aspect, the present invention is a sodium-sulfur cell, comprising a solid electrolyte tube, an insulative ring, a gap of 100-500 $\mu$m formed between the solid electrolyte tube and the insulative ring, and a solder glass filled in the gap for joining the insulative ring to the solid electrolyte tube.

Preferably, a tapered portion is formed on at least one of the solid electrolyte tube and the insulative ring for providing a glass reservoir at the end portion of the negative electrode chamber facing the solder glass.

"A tapered portion" formed on the solid electrolyte tube or the insulative ring for providing a glass reservoir used herein includes broadly both a smooth linear surface and a curved surface.

Preferably, the solder glass is an alumina borosilicate series glass and maintains a concentration of boron B at a depth of 10 μm from the surface of the alumina borosilicate series glass in the joining portion to at least 90% of the concentration of boron B at a depth of 1000 μm from the surface of the alumina borosilicate series glass in the joining portion.

In the second aspect, the present invention is a method of joining a solid electrolyte tube and an insulative ring by means of an alumina borosilicate series glass, comprising, defining a small space surrounding a joining portion of the solid electrolyte tube and the insulative ring with the aid of an atmosphere-protecting jig, and joining the solid electrolyte tube and the insulative ring in the small space, while preventing evaporation of components of the alumina borosilicate series glass from the surface of the glass.

BRIEF DESCRIPTION OF THE DRAWINGS

For a better understanding of the present invention, reference is made to the accompanying drawings, in which:

FIG. 1 is a schematic cross-sectional view of an embodiment of the present sodium-sulfur cell;

FIG. 2b is an enlarged view of the main portion thereof;

FIGS. 2c and 2d are enlarged views of other embodiments of the main portion of FIG. 2a;

FIG. 3a is a schematic cross-sectional view of another embodiment of the present sodium-sulfur cell;

FIG. 3b is an enlarged view of the main portion thereof;

FIGS. 3c and 3d are enlarged views of another embodiments of the main portion of FIG. 3b;

FIG. 4a is a schematic cross-sectional view of a conventional sodium-sulfur cell;

FIG. 4b is an enlarged view of the main portion thereof;

FIG. 5 is an enlarged cross-sectional view of another embodiment of the main portion of FIG. 2a.

Figure 2A:
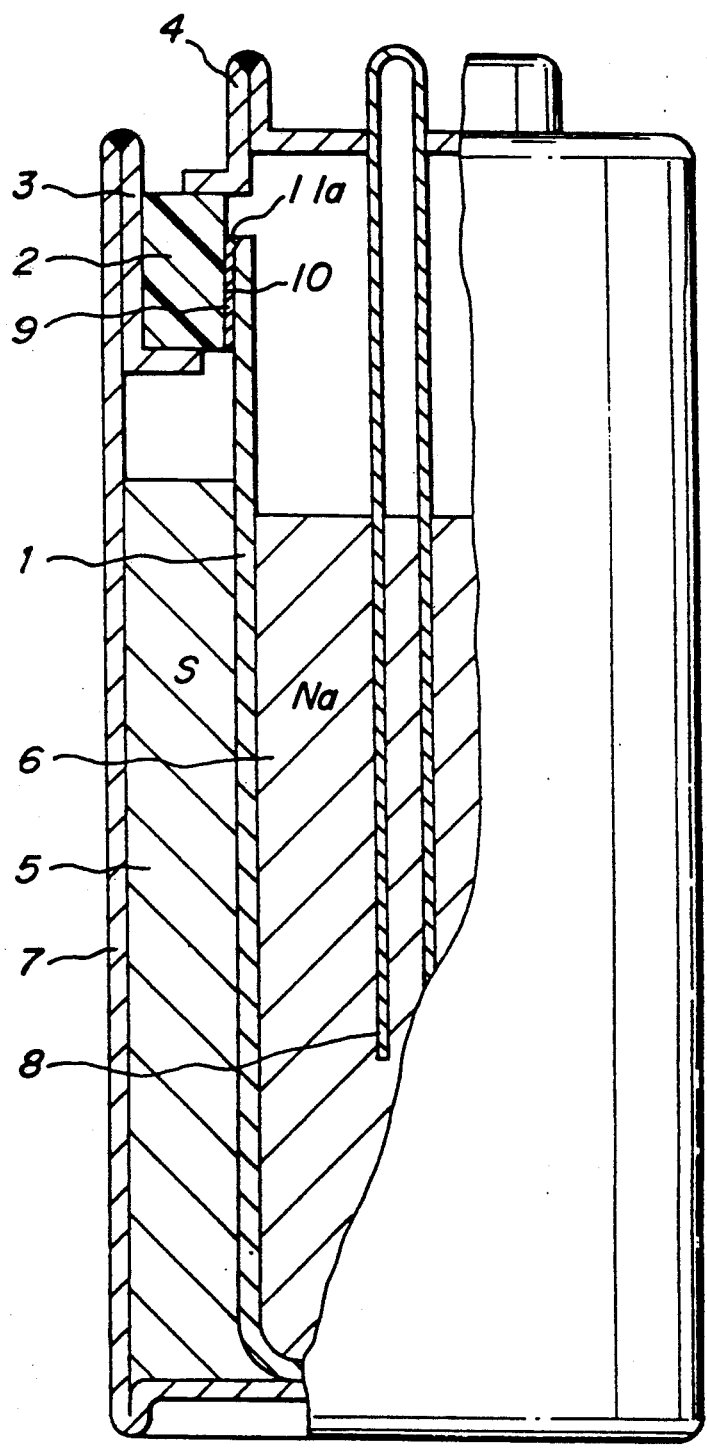
FIG. 2a is a schematic cross-sectional view of another embodiment of the present sodium-sulfur cell.

1 ... solid electrolyte tube
2 ... insulative ring
3 ... lid of positive electrode chamber
4 ... lid of negative electrode chamber
5 ... positive electrode chamber
6 ... negative electrode chamber
7 ... cell vessel
8 ... terminal tube
9 ... solder glass
10 ... gap
11a, 12a ... tapered portion of solid electrolyte tube
11b, 12b ... tapered portion of insulative ring
13 ... fixing jig
14 ... glass ring
15 ... atmosphere-protecting jig
16 ... crack

DESCRIPTION OF THE PREFERRED EMBODIMENTS

Hereinafter, the present invention will be explained in more detail with reference to examples.

Examples 1-15 and Comparative Examples 1-10

In FIG. 1, a solid electrolyte tube 1 of a bottomed cylinder shape made of β-alumina separates a positive electrode chamber 5 filled with sulfur from a negative electrode chamber 6 filled with sodium. An insulative ring 2 made of α-alumina is joined to an outer peripheral surface of an upper end of the solid electrolyte tube 1 with a solder glass 9. The insulative ring 2 is joined, under heating and pressure, between a positive electrode lid 3 at an upper end of a cell vessel 7 and a negative electrode lid 4 having a terminal tube 8 of the negative electrode so that the insulative ring 2 ensures electric insulation between the lids 3 and 4. The insulating ring 2 is spaced from the outer peripheral surface of the solid electrolyte tube 1 by a gap 10 of a given distance, and joined to the solid electrolyte tube 1 with an alumina borosilicate based solder glass filled into the gap 10, so that sodium or sodium vapor as a negative electrode active substance may be prevented from directly reacting with sulfur or sulfide as a positive electrode active substance. In the present invention, it is necessary to set the gap 10 defined between the outer peripheral surface of the upper end of the solid electrolyte tube 1 and the inner peripheral surface of the insulative ring 2 to a distance S of 100–500 μm. When the solder glass 9 is filled into the gap 10, the solid electrolyte tube 1 and the insulative ring 2 can be uniformly and assuredly joined together. The above distance was determined by thoroughly examining properties of the solder glass. If the distance S of the gap 10 is smaller than 100 μm, the solder glass does not sufficiently flow into the gap 10 on joining with the solder glass, so that the filled state of the solder glass on the side of the end portion of the solid electrolyte tube 1 within the gap 10 becomes non-uniform, and sufficient corrosion resistance against sodium vapor cannot be exhibited. As a result, a danger arises that the solder glass 9 is cracked. On the other hand, if the distance S is greater than 500 μm, the filled amount of the solder glass 9 is so much that mechanical strength thereof decreases, and the solder glass cannot withstand various loads occurring on increase and decrease in temperature of the cell, which may destruct the solder glass. Preferably, the length l of a straight portion of the gap 10 is set at at least 3 mm to ensure mechanical strength thereof. Furthermore, preferably, the solder glass 9 to be filled into the gap 10 is composed of an alumina borosilicate series glass, for example, comprising four ingredients of 0–80 wt% of $SiO_2$, 0–30 wt% of $Al_2O_3$, 0–80 wt% of $B_2O_3$ and 0–30 wt% of $Na_2O$, and has a coefficient of thermal expansion substantially equal to or slightly smaller than that of the solid electrolyte tube 1 and the insulating ring 2 to reduce the residual stresses and maintain sufficient joining strength. Moreover, preferably, the solder glass is a glass having a sufficient fluidity giving viscosity in a range of 800–1,200 Pa.S in a temperature range of not more than 1,200° C. so that the solder glass may not form a reaction phase with β-alumina during the joining with the glass solder to decrease the joining strength, and the glass has small influences upon the filling properties and joining strength inside the gap 10 in a heating step during the joining under heating and pressure between the insulative ring 2 and the negative electrode lid 4 or the positive electrode lid 3 in a post treatment.

Concrete examples of the solder glass 9 used in these Examples are shown in the following Table 1.

TABLE 1

| No. | Composition (wt %) | | | | CTE ($\times 10^{-6}$/°C.) | Softening point (°C.) | Viscosity [$10^3$ Pa · S] (°C.) |
|---|---|---|---|---|---|---|---|
| | $SiO_2$ | $Al_2O_3$ | $B_2O_3$ | $Na_2O$ | | | |
| A | 65.0 | 10.0 | 14.0 | 11.0 | 6.0 | 750 | 1050 |
| B | 70.0 | 5.0 | 18.0 | 7.0 | 6.1 | 710 | 980 |
| C | 40.0 | 15.0 | 30.0 | 15.0 | 6.3 | 700 | 990 |
| D | 30.0 | 20.0 | 40.0 | 10.0 | 6.0 | 690 | 980 |
| E | 70.1 | 8.1 | 7.7 | 13.8 | 7.0 | 580 | — |
| F | 65.1 | 7.4 | 14.0 | 13.5 | 6.9 | 550 | — |
| G | 60.0 | 13.1 | 15.7 | 11.2 | 6.7 | 545 | — |
| H | 64.9 | 7.4 | 16.4 | 11.3 | 6.85 | 520 | — |

CTE is an abbreviation of coefficient of thermal expansion

Next, a glass ring was prepared from a glass having a composition and physical properties of the glasses A-D shown in the above Table 1. Meanwhile, the lower portion of the solid electrolyte tube 1 was inserted into the insulative ring 2, and the glass ring was set in a space between the solid electrolyte tube 1 and the insulative ring 2. The glass ring had an inner diameter greater than the outer diameter of an opened portion of the solid electrolyte tube 1 by 200 μm, and a weight corresponding to a volume of a gap 10 to be defined by the solid electrolyte tube 1 and the glass ring. The glass ring was then heated at a temperature-increasing rate of 150° C./Hr, maintained at a maximum temperature for 1 hour, and then cooled. The thus joined bodies of the solid electrolyte tube 1 and the insulative ring 2 were evaluated on glass-filling property, cantilever bending strength and durability.

Evaluations were made in the following ways: With respect to the glass-filling property, a joined body in which the glass was filled into the gap 10 in the entire circumferential direction is expressed with a symbol ⊙, one in which the glass was filled into the gap not in the entire circumferential direction but in 50% or more of the entire circumferential direction is expressed with a symbol ○, and one in which the glass was filled into the gap in less than 50% of the entire circumferential direction is expressed with a symbol ×, respectively. With respect to the cantilever bending strength, destruction strengths of each twenty joined bodies (n=each 20) were measured for each case when a load was exerted on a tip portion of the solid electrolyte tube 1 in a direction perpendicular to the axial direction thereof in the state that the insulative ring 2 was grasped or held. The maximum average strength is taken as 100, and symbols ⊙, ○, and ×, respectively denotes a joined body in which the average destruction strength was 95% or more, one in which the average destruction strength was 85% or more and less than 95%, and one in which the average destruction strength was less than 70%. With respect to the durability, the joined portions were immersed in metallic sodium at 500° C., and an average life until occurrence of cracks due to corrosion of the glass was measured for each five joined bodies (n=each 5) for each case. The maximum average strength is taken as 100, and symbols ⊙, ○, Δ and ×, respectively denotes a joined body in which the average life was 90% or more, one in which the average life was 70% or more and less than 90%, one in which the average life was 50% or more and less than 70%, and one in which the average life was less than 50%. As shown in the following Table 2, it is acknowledged that the joined bodies according to the present invention have splendid properties, and shows results of Comparative Examples 1-10.

TABLE 2

| Example | | Glass No. | Gap for joining (μm) | Length of joining (mm) | Temperature at joining (°C.) | Glass filling property | Cantilever strength | Durability |
|---|---|---|---|---|---|---|---|---|
| Invention | 1 | A | 100 | 2.0 | 1050 | ⊙ | Δ | ⊙ |
| | 2 | A | 100 | 3.0 | 1050 | ⊙ | ○ | ⊙ |
| | 3 | A | 150 | 2.0 | 1050 | ⊙ | ○ | ⊙ |
| | 4 | A | 150 | 3.0 | 1050 | ⊙ | ⊙ | ⊙ |
| | 5 | A | 150 | 4.0 | 1050 | ○ | ⊙ | ○ |
| | 6 | A | 250 | 3.0 | 1050 | ⊙ | ○ | ⊙ |
| | 7 | A | 250 | 4.0 | 1050 | ⊙ | ⊙ | ⊙ |
| | 8 | A | 400 | 4.0 | 1050 | ⊙ | ○ | ⊙ |
| | 9 | A | 500 | 5.0 | 1050 | ⊙ | ○ | ⊙ |
| | 10 | B | 100 | 3.0 | 1000 | ○ | ○ | ○ |
| | 11 | C | 100 | 3.0 | 980 | ⊙ | ⊙ | ⊙ |
| | 12 | C | 250 | 5.0 | 980 | ○ | ⊙ | ⊙ |
| | 13 | D | 150 | 3.0 | 1000 | ⊙ | ⊙ | ⊙ |
| | 14 | D | 250 | 3.0 | 1000 | ⊙ | ⊙ | ⊙ |
| | 15 | D | 350 | 3.0 | 1000 | ⊙ | ⊙ | ⊙ |
| Comparative | 1 | A | 50 | 1.0 | 1050 | ⊙ | × | ⊙ |
| | 2 | A | 50 | 3.0 | 1050 | × | × | × |
| | 3 | A | 50 | 3.0 | 1150 | × | × | × |
| | 4 | A | 550 | 5.0 | 1050 | ⊙ | × | ⊙ |
| | 5 | B | 50 | 3.0 | 1000 | × | × | × |
| | 6 | B | 550 | 3.0 | 1000 | ⊙ | × | ⊙ |
| | 7 | C | 600 | 3.0 | 950 | ⊙ | × | ⊙ |
| | 8 | C | 600 | 5.0 | 980 | ⊙ | × | ⊙ |
| | 9 | D | 50 | 3.0 | 1000 | × | × | × |

TABLE 2-continued

| Example | Glass No. | Gap for joining (μm) | Length of joining (mm) | Temperature at joining (°C.) | Glass filling property | Cantilever strength | Durability |
| --- | --- | --- | --- | --- | --- | --- | --- |
| 10 | D | 50 | 3.0 | 1200 | ⊚ | X | ⊚ |

As apparent from the above description, the cell of this embodiment can prevent formation of cracks in the joining portion of the solid electrolyte tube and the insulative ring for a long period by using the solder glass as described in the above Table 1 of a desired thickness as a joining agent between the solid electrolyte tube and the insulative ring, so that the cell can prevent a direct reaction of the active substances of the electrodes with each other thereby to securely prevent overheating problems and exceedingly prolong the life of the cell.

Examples 16-45 and Comparative Examples 11-14

In the embodiment shown in FIGS. 2b, a solid electrolyte body 1 has at the upper end of the outer circumferential surface thereof a tapered portion 11a formed by grinding of the tube 1 with a diamond grinding stone, etc., for forming a glass reservoir at the top portion of the solder glass 9 which is attacked most by sodium or sodium vapor of the positive electrode chamber 6. In FIGS. 2c and 2d another embodiments are shown of forming the reservoir at the top portion of the solder glass 9, wherein a tapered portion 11b is formed at an insulative ring 2, and tapered portions 11a and 11b are formed at the solid electrolyte tube 1 and the insulative ring 2, respectively, by grinding, for example. Preferably, the tapered portion 11a and 11b have a height or depth of around 0.5-2 mm, preferably around 1 mm, an inclination angle $\theta_{11a}$ and $\theta_{11b}$ to the vertical direction of around 5°-75°, preferably 15°-45°. If the inclination angles $\theta_{11a}$ and $\theta_{11b}$ are less than 5°, the stresses tend to concentrate on the top portions of the solder glasses 9, 9 at the tapered portions 11a and 11b. While, if the inclination angles $\theta_{11a}$ and $\theta_{11b}$ are larger than 75°, the stresses are likely concentrated on the bottom portions of the solder glasses 9, 9 at the tapered portions 11a and 11b resulting in frequent occurrence of cracks of the solder glasses 9, 9.

Concrete shapes of the tapered portion are shown in the following Table 3.

TABLE 3

| Shape | $\theta_a$ (β-alumina) | $\theta_b$ (α-alumina) |
| --- | --- | --- |
| 1 | non-tapered (0°) | non-tapered (0°) |
| 2 | 5 | 0 |
| 3 | 10 | 0 |
| 4 | 15 | 0 |
| 5 | 45 | 0 |
| 6 | 60 | 0 |
| 7 | 75 | 0 |
| 8 | 0 | 5 |
| 9 | 0 | 30 |
| 10 | 0 | 60 |
| 11 | 20 | 30 |
| 12 | 45 | 45 |
| 13 | 60 | 60 |
| 14 | 75 | 75 |

Another embodiment of the present sodium-sulfur cell is shown in cross-section in FIG. 3a. The type of cell in this embodiment has a positive electrode chamber 5 at the inside of the solid electrolyte tube 1, a negative electrode chamber 6 at the outside of the solid electrolyte tube 1, and a tapered portion 12b formed at an insulative ring 2 by grinding for providing a glass reservoir at the bottom portion of the solder glass 9 which is likely invaded by sodium or sodium vapor. FIG. 3b shows this main portion of FIG. 3a in enlarged view for clarification.

Figure 3D:
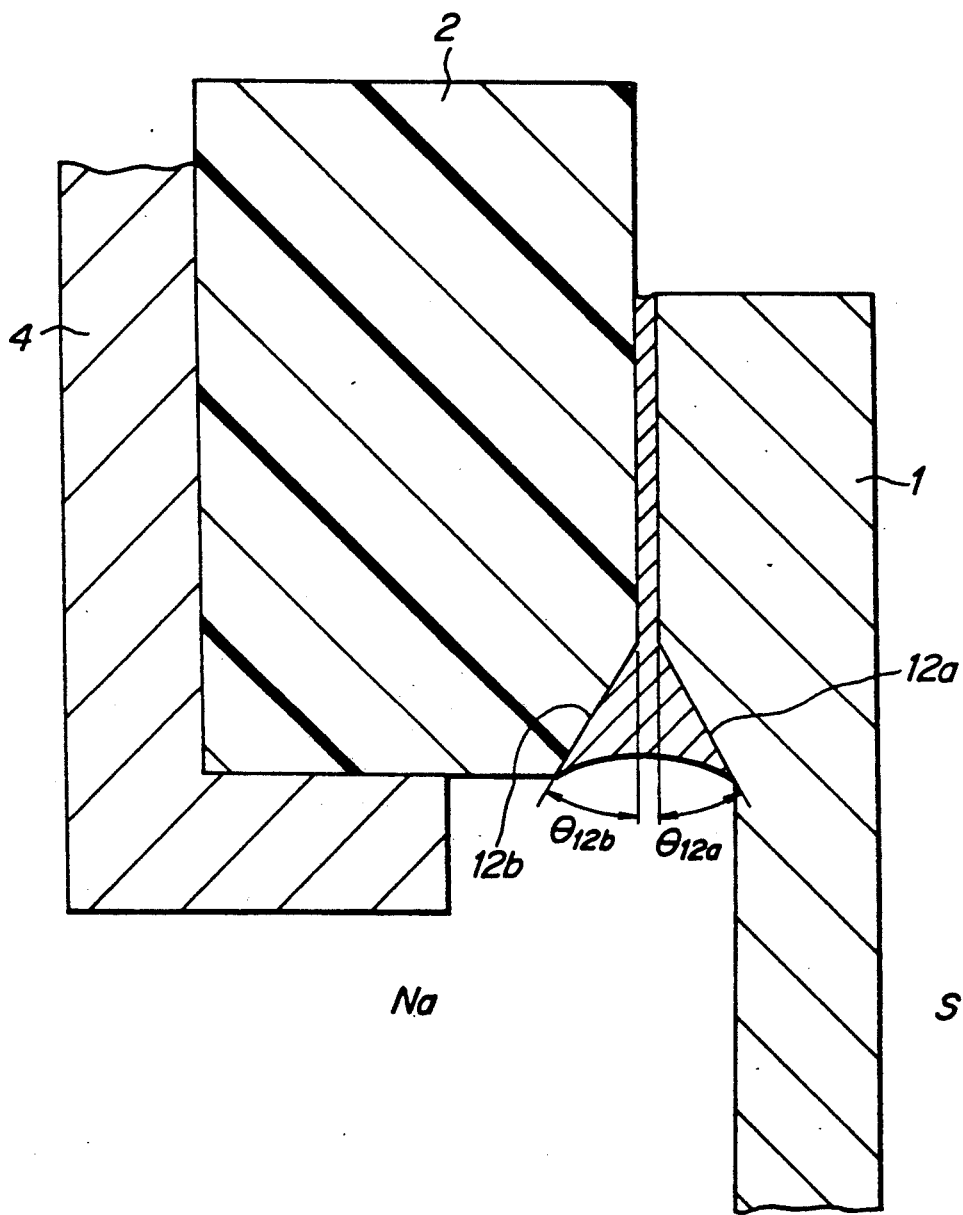
Figure 5:
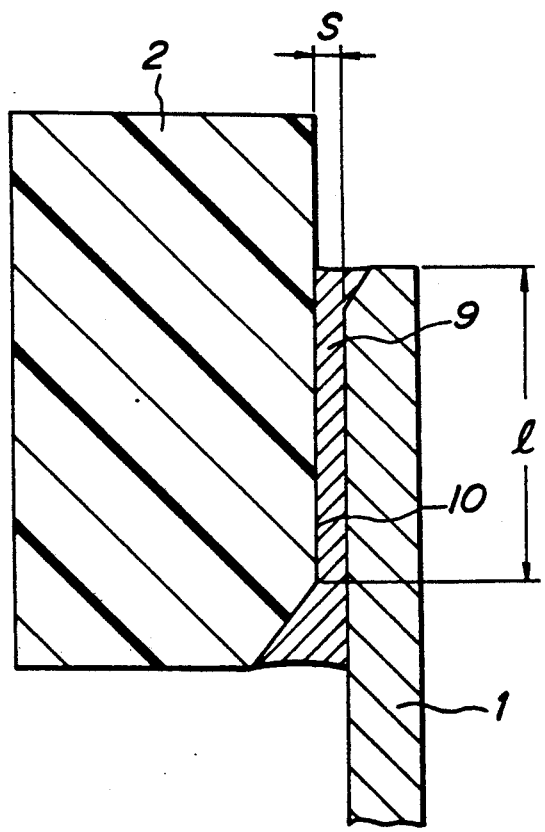

In FIGS. 3c and 3d other embodiments of the main portion of FIG. 3a are shown in enlarged views, wherein a tapered portion 12a is formed at the solid electrolyte 1, and tapered portions 12a and 12b are formed at the solid electrolyte tube 1 and the insulative ring 2, respectively. In the embodiments shown in FIG. 3a-3d, preferably, the tapered portions 12a and 12b have a height or depth of around 0.5-1.5 mm, preferably around 1 mm, an inclination angle $\theta_{12a}$ and $\theta_{12b}$ to the vertical direction of 5°-75°, preferably 15°-60°. If the inclination angles $\theta_{12a}$ and $\theta_{12b}$ are less than 5°, the stresses are likely concentrated on the bottom portions of the solder glasses 9, 9 at the tapered portions 12a and 12b. While, if the inclination angle is larger than 75°, the stresses are likely concentrated on the top portions of the solder glasses 9, 9 at the tapered portions 12a and 12b.

Sodium-sulfur cells constructed in these fashions have glass reservoirs formed by providing a tapered portion at the top portion of the solder glass 9 facing the negative electrode chamber as shown in FIGS. 2a-2d, and at the bottom portion of the solder glass 9 facing the negative electrode chamber as shown in FIGS. 3a-3d. Accordingly, these cells have small residual stresses remaining in the solder glass 9 and they receive less concentrated stresses, such as thermal stress and mechanical stress, etc., on the top portion of the solder glass 9 at the joining portion joined to the upper end of the outer circumferential surface of the solid protective tube 1 in the embodiments shown in FIGS. 2a-2d, and on the bottom portion of the solder glass 9 at the joining portion joined to the lower end of the outer circumferential surface of the insulative ring 2 in the embodiments shown in FIGS. 3a-3d. This is because the tapered portions have more smooth surfaces by grinding work than non-ground portions, which smooth surfaces can prevent formation of cracks in the solder glass 9.

The joining portion of the solid electrolyte tube 1 made of sintered α-alumina and the insulative ring made of α-alumina by means of the solder glass is formed by melting and reacting the solder glass 9 at high temperatures, so that components of the solder glass, i.e., $SiO_2$, $Al_2O_3$, $B_2O_3$ and $Na_2O$ in the case of the present invention, form an intermediate product with β-alumina at the interface thereof. The intermediate product is rich in Na component and considered weak to corrosion by metallic Na at high temperatures.

The surface of the solid electrolyte body made of the sintered β-alumina has many undulations due to forming thereof and the stresses are likely concentrated at micro areas thereof. The inventors have found out that when β-alumina and α-alumina respectively not having a tapered portion is actually joined by the solder glass and subjected to a test of resistance to corrosion by metallic Na at high temperatures, a crack is formed from the surface of β-alumina at the joining intersurface of β-alumina and the solder glass. This fact means that the joining interface has uneven distribution of composition and is weak in corrosion resistant property and that the surface shape of β-alumina is participated largely in the crack formation. From the viewpoint, it is considered that an effect of preventing a crack which is formed on the β-alumina surface and causes final destruction of the joining portion can be obtained by providing a slight tapering treatment on the β-alumina facing the end portion of the joining portion which is exposed to metallic Na or Na vapor of the negative electrode chamber.

The stresses generated in the joining portion of β-alumina and α-alumina by means of the solder glass depends principally on a difference between coefficients of thermal expansion (CTE) of the materials constituting the joining portion. From a practical viewpoint, particularly the residual stress generated in the solder glass at the time of cooling thereof after joining has to be designed to be minimum, among the stresses generated in the joining portion. The residual stress can be decreased by providing a tapered portion at at least one of β-alumina and α-alumina. This is because a wettable shape of the solder glass at the end of the joining portion assumes a dull angle so as to avoid concentration of the stresses.

However, if the end of the worked or tapered surface of β-alumina is embedded in the solder glass, tensile stresses are concentrated on the end portion of the solder glass. The stresses generated in this portion has a tendency of increasing with increase of edge angle or tapered angle of the tapered portion relative to the longitudinal axis of β-alumina. Therefore, it is considered that, when the edge angle is large, if a crack formed at the joining interface of β-alumina and the solder glass is developed to the edge portion of the tapered portion, the tensile stresses are liberated resulting in destruction of the cell.

TABLE 4

Reaction Time with High Temperature Metallic Na and Crack Occurrence %

| | | Sample shape | Glass | Reaction time (hr) 100 | 200 | 400 | 1000 | 2000 | 4000 |
|---|---|---|---|---|---|---|---|---|---|
| Example | 16 | 2 | B | ○ | ○ | ○ | x | x | x |
| | 17 | 2 | C | ○ | ○ | △ | x | x | x |
| | 18 | 3 | A | ○ | ○ | ○ | △ | x | x |
| | 19 | 3 | B | ○ | ○ | ○ | x | x | x |
| | 20 | 4 | B | ○ | ○ | ○ | △ | x | x |
| | 21 | 4 | D | ○ | ○ | ○ | ○ | △ | x |
| | 22 | 5 | A | ○ | ○ | ○ | ○ | ○ | ○ |
| | 23 | 5 | C | ○ | ○ | ○ | ○ | ○ | ○ |
| | 24 | 6 | A | ○ | ○ | ○ | ○ | ○ | ○ |
| | 25 | 6 | B | ○ | ○ | ○ | ○ | ○ | ○ |
| | 26 | 7 | B | ○ | ○ | ○ | ○ | ○ | △ |
| | 27 | 7 | C | ○ | ○ | ○ | ○ | ○ | ○ |
| | 28 | 8 | A | ○ | ○ | △ | x | x | x |
| | 29 | 8 | C | ○ | ○ | △ | x | x | x |
| | 30 | 9 | A | ○ | ○ | ○ | △ | x | x |
| | 31 | 9 | B | ○ | ○ | ○ | x | x | x |
| | 32 | 9 | D | ○ | ○ | ○ | ○ | x | x |
| | 33 | 10 | B | ○ | ○ | ○ | △ | x | x |
| | 34 | 10 | D | ○ | ○ | ○ | △ | x | x |
| | 35 | 11 | B | ○ | ○ | ○ | ○ | ○ | △ |
| | 36 | 11 | C | ○ | ○ | ○ | ○ | ○ | x |
| | 37 | 11 | D | ○ | ○ | ○ | ○ | ○ | △ |
| | 38 | 12 | A | ○ | ○ | ○ | ○ | ○ | ○ |
| | 39 | 12 | B | ○ | ○ | ○ | ○ | ○ | ○ |
| | 40 | 12 | C | ○ | ○ | ○ | ○ | ○ | ○ |
| | 41 | 12 | D | ○ | ○ | ○ | ○ | ○ | ○ |
| | 42 | 13 | B | ○ | ○ | ○ | ○ | ○ | ○ |
| | 43 | 13 | C | ○ | ○ | ○ | ○ | ○ | ○ |
| | 44 | 14 | C | ○ | ○ | ○ | ○ | △ | △ |
| | 45 | 14 | D | ○ | ○ | ○ | ○ | ○ | △ |
| | 11 | 1 | A | △ | x | x | x | x | x |
| Comparative Example | 12 | 1 | B | ○ | △ | x | x | x | x |
| | 13 | 1 | C | ○ | △ | x | x | x | x |
| | 14 | 1 | D | ○ | △ | x | x | x | x |

Examples 46–58 and Comparative Example 15–18

Hereinafter, the effects of the present invention are shown.

In these examples, the glasses of Table 1 are used and samples are prepared in the same manner as described in Examples 1–13.

Evaluation method of corrosion-resistant properties of samples

The thus obtained joined bodies of sample shapes of Nos. 1–14 of Table 4 are sealed together with metallic Na in securedly air-tight metallic vessels at a high temperature of 400° C. in vacuo, and left to stand for a determined time. The high temperature of 400° C. in the vessels used herein is a severe condition which is higher than operating temperatures of 300°–350° C. of sodium-sulfur cells, and corresponds to an acceleration test of about 50 times of 330° C., for example. The resultant sample are annealed to room temperature, and metallic Na thereof are solved in an alcohol and removed from the joining portions, and then the joining portions joined by the joining glasses A–D are inspected at the metallic Na-contacted surfaces on formation of cracks.

Occurrence or non-occurrence of cracks in the joining portions is checked by immersion of the samples in a damage survey fluorescent liquid and irradiating the samples with an ultraviolet ray.

The measurements are made on 20 test pieces for each sample and average values thereof are obtained. Non-cracked samples are further subjected to the corrosion test.

Results of evaluation test

The results of the evaluation test on the samples are shown in the Table 4. In Table 4, crack occurrence of 0% (no test piece cracked) is shown with a symbol ⊚, 5% (1) test piece cracked) with a symbol ○, 10–30% (2–6 test pieces cracked) with a symbol Δ, and 35% or more (7 or more test pieces cracked) with a symbol ×.

As apparent from the above evaluation results, the surface of the tapered portion can be made smooth, and cracks in the joining portions joined by the solder glass can be prevented from occurring, by providing a tapered portion at the solid electrolyte tube and/or the insulative ring by grinding work so as to form a glass reservoir in the joining portion of the solid electrolyte tube and the insulative ring at the contacting portion of the solder glass with metallic Na or Na vapor.

Thus, by providing a tapered portion on at least one of the solid electrolyte tube 1 and the insulative ring 2 at the joining portion thereof by means of the solder glass, cracks in the joining portion can be completely prevented from occurring, leakage of the active substance Na from the negative electrode chamber can be prevented, and the dangers of the direct reaction of the active substance Na of the negative electrode chamber with the active substance S of the positive electrode chamber can be eliminated as well as the danger of generation of an extraordinary of the cell, so that a highly safe sodium-sulfur cell of an exceedingly long life can be obtained.

As described above, in the joining method of the present invention, at the time of joining the solid electrolyte tube and the ceramic insulative ring the joining is effected by means of the solder glass while covering the joining portion with the aid of the atmosphere protecting jig thereby to prevent the evaporation of the solder glass components from the glass surface. As a result, a difference between the compositions of the solder glass at the surface and the interior thereof is decreased. Particularly, when a concentration of easily vaporizable boron B is attentioned, the concentration of boron at a depth of 10 μm from the surface of the glass can be maintained to at least 90% of the concentration of boron at a depth of 1000 μm from the surface of the glass. Because the compositions of the glass at the interior and the surface are uniformed in this way, CTE of the joining portion at the surface and the interior are also uniformed to reduce the residual stresses, so that superior joined bodies having joining portion of high mechanical strength can be obtained. The difference of the concentration of boron between the interior and the surface of the joining portion or the solder glass is defined as less than 10% as described above, because if the difference exceeds 10%, the joining portion and hence the sodium-sulfur cell gradually reach to the levels of conventioned ones.

Figure 6:
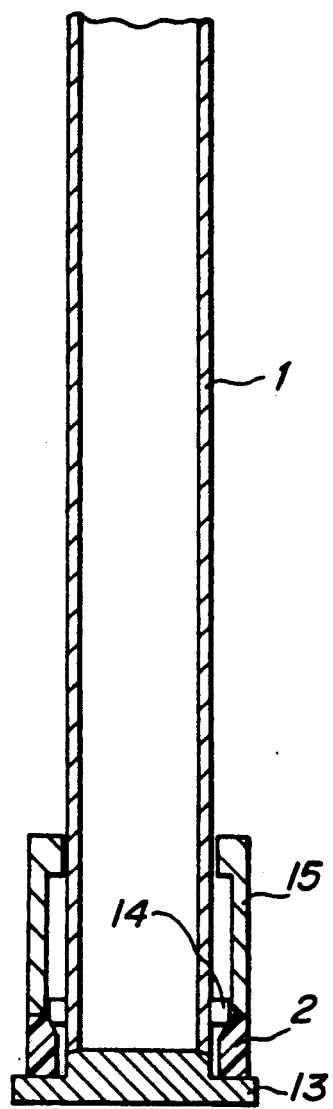
FIG. 6 is a cross-sectional view of an apparatus used for preparation of the present sodium-sulfur cell. Numbering in the is as follows.

In this embodiment, a solid electrolyte tube 1 made of β-alumina of a shape of one end sealed cylinder having an outer diameter of 30.0 mm and a length of 300 mm, and an insulative ring 2 made of α-alumina having an outer diameter of 42.0 mm and a height of 10.0 mm, are prepared and set on a fixing jig 13, and a glass ring 14 made of an alumina borosilicate series glass is disposed therebetween, as shown in FIG. 6. The insulative ring 2 has a preliminarily formed tapered portion for determining a height of the glass ring 14. The glass ring 14 has a thickness of 1 mm and a height of 2 mm and a composition of either one of 4 types E–H of compositions as shown in the above Table 1, and is a well defoamed one.

A cylinder made of α-alumina having an outer diameter slightly larger than the solid electrolyte tube 1 and a shape of covering the glass ring 14 is prepared as an atmosphere-protecting jig 15 and placed on the upper surface of the insulative ring 2. In order to ascertain the effect of the present invention, 5 types of a–e of atmosphere-protecting jig having an inner diameter and a height as shown in the following Table 5 are prepared.

For comparison, joinings are effected without using the atmosphere-protecting jig 15.

TABLE 5

| Type | Shape of Atmosphere-protecting Jig | | |
|------|---|---|---|
| | Inner diameter (mm) | Height (mm) | Space volume (cm$^3$) |
| a | 30.2 | 5 | 5.1 |
| b | 30.2 | 100 | 102.1 |
| c | 30.2 | 300 | 306.3 |
| d | 31.0 | 5 | 5.1 |
| e | 32.0 | 5 | 5.1 |

Joining tests are performed in combinations of the glass compositions E–H and the atmosphere-protecting jigs a–e and in a same glass melting condition as those of Examples 1–15. The joinings are effected under conditions corresponding to high temperature viscosities of respective glass. For example, in the case of glass E, temperature is raised from room temperature up to a maximum temperature of 1,150° C. at a temperature-increasing rate of 200° C./hr, held thereat for 1 Hr, decreased to around a glass transition temperature at a temperature-decreasing rate of 200° C./hr, and annealed to room temperature at a temperature-decreasing rate of 20° C./hr.

The thus obtained glass-joining bodies are measured on mechanical strength.

The measuring method is comprised of grasping the upper and the lower surfaces of the insulative ring 2 of the glass-joining body, exerting a moment load on the joining portion by loading a weight or pressure on the sealed end portion of the solid electrolyte 1, and measuring the load at the destruction of the joining portion.

The measurements of destruction of the joining portion are effected on 20 test pieces for each joining condition as described in the following Table 6, and an average load at the destruction and standard deviation thereof are also shown in Table 6. All the positions of destruction were at the solder glass joining the solid electrolyte 1 and the insulative ring 2.

TABLE 6

| Example | | Glass composition | Shape of Jig | Load at Destruction (N) | |
|---|---|---|---|---|---|
| | | | | Average | Standard Deviation |
| Invention | 46 | E | a | 265 | 18 |
| | 47 | " | b | 254 | 24 |
| | 48 | F | a | 368 | 24 |
| | 49 | " | b | 350 | 18 |
| | 50 | " | c | 330 | 55 |
| | 51 | " | d | 325 | 23 |
| | 52 | " | e | 305 | 65 |
| | 53 | G | b | 389 | 16 |

TABLE 6-continued

| Example | Glass composition | Shape of Jig | Load at Destruction (N) Average | Standard Deviation |
|---|---|---|---|---|
| | 54 | " | c | 365 | 55 |
| | 55 | " | e | 374 | 60 |
| | 56 | H | a | 366 | 16 |
| | 57 | " | c | 348 | 43 |
| | 58 | " | d | 352 | 21 |
| Comparative | 15 | E | none | 133 | 45 |
| | 16 | F | " | 186 | 52 |
| | 17 | G | " | 200 | 64 |
| | 18 | H | " | 154 | 54 |

In any composition of the glass, the glass-joining bodies obtained by using the atmosphere-protecting jig 15 have large loads at destruction, exhibiting the remarkable effect of the present invention. In the embodiments using the atmosphere-protecting jig 15, when the protected space volume is small or when the gap between the solid electrolyte tube 1 and the atmosphere-protecting jig 15 is small, the standard deviation which represents scattering of the loads at destruction is small, so that such cases are considered as more splendid combinations from the viewpoint of reliability.

The joining glass portions after destruction were studied on distribution of composition at cross-sections of the joining portions for evaluating the uniformity or homogeneity of the glass portions. For that purpose, the glass joining portions are severed along the axial direction of the solid electrolyte tube 1, and the severed surfaces are optically polished, and states of deviation of chemical composition at the surface and the interior of the glass protected by the jig 15 were analyzed using EPMA. The analyses are effected by spot analysis at interior of around 30 μm and 1000 μm from the surface of the glass protected by the jig 15. The results are shown in the following Table 7. The analyses are effected also by linear analyses to study distribution of concentrations of specific elements from the surface towards the interior of the glass. The results are shown in the following Table 8.

TABLE 7

| | | Glass | Jig | Chemical Composition (wt %) | | | | | | | |
|---|---|---|---|---|---|---|---|---|---|---|---|
| | | | | Near the Surface | | | | Interior | | | |
| Example | | Type | Shape | $SiO_2$ | $Al_2O_3$ | $B_2O_3$ | $Na_2O$ | $SiO_2$ | $Al_2O_3$ | $B_2O_3$ | $Na_2O$ |
| Invention | 48 | F | a | 65.2 | 7.4 | 14.0 | 13.4 | 65.1 | 7.4 | 14.0 | 13.5 |
| | 49 | F | b | 65.3 | 7.4 | 13.9 | 13.4 | 65.1 | 7.5 | 14.0 | 13.4 |
| | 50 | F | c | 65.4 | 7.4 | 13.8 | 13.4 | 65.2 | 7.5 | 13.9 | 13.4 |
| | 51 | F | d | 65.2 | 7.5 | 13.9 | 13.4 | 65.1 | 7.5 | 14.0 | 13.4 |
| | 52 | F | e | 65.4 | 7.5 | 13.7 | 13.4 | 65.2 | 7.4 | 14.0 | 13.4 |
| Comparative | 16 | F | none | 68.5 | 7.8 | 9.5 | 14.2 | 65.2 | 7.4 | 14.0 | 13.4 |
| | 17 | G | none | 62.7 | 13.7 | 11.5 | 11.7 | 60.1 | 13.1 | 15.6 | 11.2 |

TABLE 8

| | | | | Depth from the Glass Surface (μm) and Concentration of Element (relative value) | | | | | | |
|---|---|---|---|---|---|---|---|---|---|---|
| Example | Glass Type | Jig Shape | Element | 10 | 20 | 30 | 50 | 100 | 200 | 1000 |
| 48 | F | a | B | 100 | 100 | 100 | 100 | 100 | 100 | 100 |
| " | " | " | Si | 100 | 100 | 100 | 100 | 100 | 100 | 100 |
| " | " | " | Al | 100 | 100 | 100 | 100 | 100 | 100 | 100 |
| " | " | " | Na | 100 | 100 | 100 | 100 | 100 | 100 | 100 |
| 49 | F | b | B | 100 | 100 | 100 | 100 | 100 | 100 | 100 |
| " | " | " | Si | 100 | 100 | 100 | 100 | 100 | 100 | 100 |
| " | " | " | Al | 100 | 100 | 100 | 100 | 100 | 100 | 100 |
| " | " | " | Na | 100 | 100 | 100 | 100 | 100 | 100 | 100 |
| 52 | F | e | B | 95 | 95 | 100 | 100 | 100 | 100 | 100 |
| " | " | " | Si | 100 | 100 | 100 | 100 | 100 | 100 | 100 |
| " | " | " | Al | 100 | 100 | 100 | 100 | 100 | 100 | 100 |
| " | " | " | Na | 100 | 100 | 100 | 100 | 100 | 100 | 100 |
| 16 | F | none | B | 60 | 65 | 65 | 80 | 100 | 100 | 100 |
| " | " | " | Si | 105 | 105 | 105 | 105 | 100 | 100 | 100 |
| " | " | " | Al | 105 | 105 | 105 | 105 | 100 | 100 | 100 |
| " | " | " | Na | 105 | 105 | 105 | 105 | 100 | 100 | 100 |
| 17 | G | none | B | 70 | 75 | 80 | 90 | 100 | 100 | 100 |
| " | " | " | Si | 105 | 105 | 105 | 100 | 100 | 100 | 100 |
| " | " | " | Al | 105 | 105 | 105 | 105 | 100 | 100 | 100 |
| " | " | " | Na | 105 | 105 | 105 | 100 | 100 | 100 | 100 |

As apparent from the above explanations, when the joining of the solid electrolyte tube and the insulative ring by means of a solder glass is effected by the method of defining a small space surrounding the joining portion of the solid electrolyte tube and the insulative ring with the aid of the atmosphere-protecting jig, and joining the solid electrolyte tube and the insulative ring in the small space, while preventing evaporation of the solder glass components from the surface of the solder glass, a difference of compositions between the surface and the interior of the solder glass can be made small, so that the solder glass becomes uniform. Particularly, in conventional methods of not using an atmosphere-protecting jig, a concentration of boron B at a depth of 10 μm from the surface of a solder glass in the joining portion is decreased to a very low value of not more than 60% relative to a concentration of B at a depth of 1000 μm from the surface of the solder glass. In contrast, in the method of the present invention, the concentration of boron B at the depth of 10 μm from the solder glass surface is maintained at a very high value of 90% or more, so that the mechanical strength of the joining portion can be made exceedingly high as compared to that of a conventional joining portion.

As described in detail in the foregoing explanations, the present invention provides a sodium-sulfur cell and a method of joining the solid electrolyte tube and the insulative ring which obviates prior problems, so that it is eminently useful to the development of the industry.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A method of joining a solid electrolyte tube and an insulative ring by means of an alumina borosilicate series glass, comprising the steps of:
   defining a small space surrounding a joining portion between the solid electrolyte tube and the insulative ring with the aid of an atmosphere-protecting jig; and
   joining the solid electrolyte tube and the insulative ring in the small space;
   whereby the atmosphere-protecting jig prevents evaporation of components of the alumina borosilicate series glass from the surface of the glass.

2. A sodium-sulfur cell, comprising a solid electrolyte tube, an insulative ring, a gap of 100–500 $\mu$m formed between the solid electrolyte tube and the insulative ring, and a solder glass filled in the gap for joining the insulative ring to the solid electrolyte tube, wherein a tapered portion is formed on at least one of the solid electrolyte tube and the insulative ring for providing a glass reservoir at an end portion of the solder glass which faces the negative electrode chamber.

3. A sodium-sulfur cell, comprising a solid electrolyte tube, an insulative ring, a gap of 100–500 $\mu$m formed between the solid electrolyte tube and the insulative ring, and a solder glass filled in the gap for joining the insulative ring to the solid electrolyte tube, wherein the solder glass is an alumina borosilicate series glass and maintains a concentration of boron B at a depth of 10 $\mu$m from the surface of the alumina borosilicate series glass in the joining portion between the solid electrolyte tube and the insulative ring to at least 90% of the concentration of boron B at a depth of 1000 $\mu$m from the surface of the alumina borosilicate series glass in the joining portion.

4. The sodium-sulfur cell of claim 2, wherein said gap has an axial length of at least 3 mm.

5. The sodium-sulfur cell of claim 2, wherein said solder glass has a viscosity of 800–1200 Pa.S in a temperature range of not more than 1200° C.

6. The sodium-sulfur cell of claim 2, wherein said tapered portion has an inclination angle, with respect to the longitudinal axis of the solid electrolyte tube, of 5°–75°.

7. The sodium-sulfur cell of claim 2, wherein said tapered portion has an inclination angle, with respect to the longitudinal axis of the solid electrolyte tube, of 15°–60°.

8. The sodium-sulfur cell of claim 2, wherein said tapered portion has an inclination angle, with respect to the longitudinal axis of the solid electrolyte tube, of 15°–60°.

* * * * *